United States Patent
Hashish et al.

(10) Patent No.: US 12,070,881 B2
(45) Date of Patent: Aug. 27, 2024

(54) SYSTEMS AND METHODS OF INTERIM AND END OF PROCESS TREATMENT OF MANUFACTURED ARTICLES USING HIGH PRESSURE AND WATERJETS

(71) Applicant: Flow International Corporation, Kent, WA (US)

(72) Inventors: Mohamed Hashish, Bellevue, WA (US); Greg Mital, Tacoma, WA (US); Jordan Hopkins, Seattle, WA (US); Larry G. Pearson, Bonney Lake, WA (US)

(73) Assignee: Flow International Corporation, Kent, WA (US)

( * ) Notice: Subject to any disclaimer, the term of this patent is extended or adjusted under 35 U.S.C. 154(b) by 751 days.

(21) Appl. No.: 16/576,623

(22) Filed: Sep. 19, 2019

(65) Prior Publication Data
US 2021/0086409 A1    Mar. 25, 2021

(51) Int. Cl.
| | |
|---|---|
| *B29C 43/12* | (2006.01) |
| *B29C 43/56* | (2006.01) |
| *B29C 64/30* | (2017.01) |
| *B33Y 40/00* | (2020.01) |
| *B33Y 80/00* | (2015.01) |

(52) U.S. Cl.
CPC .............. *B29C 43/12* (2013.01); *B29C 43/56* (2013.01); *B29C 64/30* (2017.08); *B33Y 40/00* (2014.12); *B33Y 80/00* (2014.12); *B29C 2043/562* (2013.01)

(58) Field of Classification Search
CPC . B22F 3/156; B22F 3/15; B29C 43/56; B29C 2043/562; B29C 43/12
See application file for complete search history.

(56) References Cited

U.S. PATENT DOCUMENTS

| | | | |
|---|---|---|---|
| 3,523,148 A | 8/1970 | Boyer et al. | |
| 3,562,371 A | 2/1971 | Bush | |
| 4,212,669 A | 7/1980 | Veeck et al. | |
| (Continued) | | | |

FOREIGN PATENT DOCUMENTS

| | | |
|---|---|---|
| CN | 104369381 A | 2/2015 |
| CN | 105020208 B | 5/2017 |
| (Continued) | | |

OTHER PUBLICATIONS

Jet Definition & Meaning—Merriam-Webster https://www.merriam-webster.com/dictionary/jet (Year: 2023).*

(Continued)

*Primary Examiner* — S. Behrooz Ghorishi
*Assistant Examiner* — Alexander A Wang
(74) *Attorney, Agent, or Firm* — Cozen O'Connor

(57) ABSTRACT

Disclosed herein are components, systems, and methods to improve characteristics of a manufactured article. Specifically, embodiments of a high pressure system includes an apparatus that subjects the article to specific pressures and temperatures for an amount of time to improve characteristics of the article. Methods of manufacturing include use of the high pressure system to subject the article to specific pressures and temperatures for an amount of time to improve characteristics of the article.

9 Claims, 6 Drawing Sheets

(56) References Cited

U.S. PATENT DOCUMENTS

| | | | |
|---|---|---|---|
| 4,371,396 A * | 2/1983 | Larsson | B22F 3/15 |
| | | | 901/17 |
| 4,484,881 A | 11/1984 | Asari et al. | |
| 5,110,542 A | 5/1992 | Conaway | |
| 5,244,623 A | 9/1993 | King | |
| 5,340,419 A | 8/1994 | Chandley | |
| 5,505,984 A | 4/1996 | England et al. | |
| 5,745,834 A | 4/1998 | Bampton et al. | |
| 5,816,090 A | 10/1998 | Hodge et al. | |
| 5,997,383 A | 12/1999 | Tseng | |
| 6,149,844 A * | 11/2000 | Graham | B29C 70/44 |
| | | | 425/389 |
| 7,628,001 B2 | 12/2009 | Loenneborg | |
| 8,506,836 B2 | 8/2013 | Szuromi et al. | |
| 8,512,808 B2 | 8/2013 | Yousefiani et al. | |
| 9,346,119 B2 | 5/2016 | Wilkinson et al. | |
| 9,457,533 B2 | 10/2016 | Middlemiss | |
| 10,403,925 B1 | 9/2019 | Ogata et al. | |
| 2005/0147520 A1 * | 7/2005 | Canzona | B22F 3/16 |
| | | | 419/66 |
| 2007/0228596 A1 * | 10/2007 | Fujikawa | B28B 11/24 |
| | | | 425/405.2 |
| 2011/0101574 A1 * | 5/2011 | Singh | B29C 67/04 |
| | | | 264/604 |
| 2013/0074561 A1 * | 3/2013 | Alberts | C21D 7/04 |
| | | | 72/53 |
| 2014/0345793 A1 * | 11/2014 | Micarelli | B29C 43/3642 |
| | | | 100/211 |
| 2015/0041025 A1 | 2/2015 | Wescott et al. | |
| 2015/0079528 A1 * | 3/2015 | Gardin | F27D 5/00 |
| | | | 432/24 |
| 2016/0318808 A1 | 11/2016 | Kasonde et al. | |
| 2017/0314335 A1 | 11/2017 | Kasonde et al. | |
| 2018/0022026 A1 | 1/2018 | Compton et al. | |
| 2018/0142316 A1 * | 5/2018 | Mola | B22F 3/156 |
| 2018/0264753 A1 | 9/2018 | Kornilovich et al. | |
| 2022/0168957 A1 * | 6/2022 | Houwink | B33Y 40/20 |

FOREIGN PATENT DOCUMENTS

| | | |
|---|---|---|
| CN | 106914622 A | 7/2017 |
| CN | 105252000 B | 9/2017 |
| CN | 108103541 A | 6/2018 |
| DE | 102013219961 A1 | 4/2015 |
| EP | 1154886 B1 | 12/2003 |

OTHER PUBLICATIONS

International Search Report and Written Opinion for PCT/US2020/051567, mailed Dec. 30, 2020, 17 pages.

* cited by examiner

SYSTEMS AND METHODS OF INTERIM AND END OF PROCESS TREATMENT OF MANUFACTURED ARTICLES USING HIGH PRESSURE AND WATERJETS

BACKGROUND

Technical Field

This disclosure relates to systems and methods that improve properties of manufactured articles, and more particularly, to the use of a waterjet, ultra-high pressure, or both during and/or after a manufacturing process of one or more manufactured articles.

Description of the Related Art

Subjecting manufactured articles to high-pressure is a known method of improving characteristics of the manufactured articles. One example of high-pressure treatment for manufactured articles is isostatic pressing. During known isostatic pressing processes, an article is placed in a high pressure containment vessel. The vessel is heated and pressurized for an amount of time. Isostatic pressing is used to reduce porosity and increase density of manufactured articles.

An example of an isostatic pressing process is disclosed in U.S. Pat. No. 3,562,371. One known type of isostatic pressing is hot isostatic pressing (HIP). Known HP systems and methods include a combination of pressure around 30,000 pounds per square inch (psi) and temperature around 2,000 degrees Celsius (C). The time needed to reach the required temperatures can increase the processing time for each article being subjected to the HIP process.

It is also known to perform surface treatment on a manufactured article to improve the quality of the manufactured article. An example of a surface treatment technique is disclosed in U.S. Publication No. 2018/0264753, which describes using a waterjet to clean non-fused material from a manufactured object after its formation is complete.

BRIEF SUMMARY

Embodiments described herein provide a method of manufacturing an article, for example an article produced using an additive manufacturing process, by placing the article in a pressure vessel and subjecting the article to a desired pressure and temperature for an interval of time.

According to one embodiment, a method of manufacturing an article includes placing the article into a pressure vessel. After placing the article into the pressure vessel, the method includes increasing pressure inside the pressure vessel to greater than 30,000 psi. After increasing pressure inside the pressure vessel, the method includes subjecting the article to hydrostatic pressure while maintaining temperature inside the pressure vessel below 1000 degrees C. The method further includes reducing pressure inside the pressure vessel and removing the article from the pressure vessel.

According to one embodiment, a method of manufacturing an article includes producing a first portion of the article, and applying pressure to the first portion. The method further includes removing the pressure from the first portion and producing a second portion of the article. After removing the pressure from the first portion, the method includes applying pressure to both the first portion and the second portion. The method further includes removing the pressure from both the first portion and the second portion.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
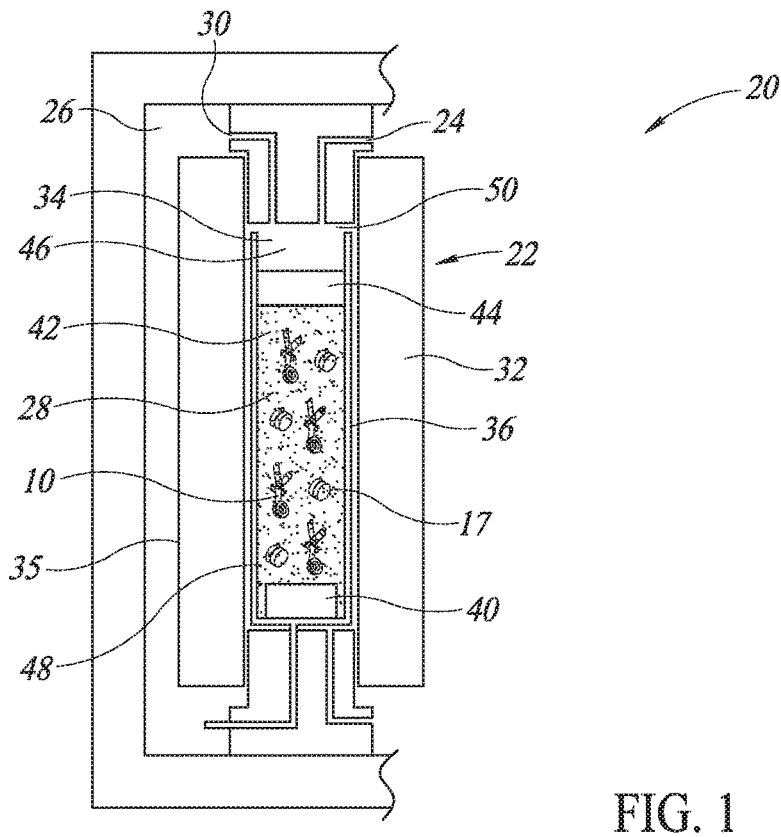
FIG. 1 is a cross-sectional elevation view of an isostatic pressure system according to one embodiment.

In the following description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with high pressure systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein.

All methods described herein can be performed in any suitable order unless otherwise indicated herein or otherwise clearly contradicted by context. Many of the methods described herein can be performed with variations. For example, many of the methods may include additional acts, omit some acts, and/or perform acts in a different order than as illustrated or described.

The headings and Abstract of the Disclosure provided herein are for convenience only and do not interpret the scope or meaning of the embodiments.

Additive manufacturing produces parts by adding material, rather than removing material as is done in conventional manufacturing processes. The unique properties of an additive manufacturing process may result in an article with defects, such as internal pores. Subjecting the article to a densification process may remove the defects and improve the characteristics of the article, for example ductility and fatigue strength.

Referring to FIGS. 1 to 4, a high pressure system 20 can define a pressure vessel 22 sized to receive at least one article 10 and subject the at least one article 10 to a high pressure for an amount of time to improve characteristics of the article 10. As used herein, the term "high pressure" includes pressure values equal to or greater than 10,000 pounds per square inch (psi). According to one embodiment, the pressure vessel 22 includes an isostatic pressure vessel, for example a hot isostatic pressure vessel.

According to one aspect of the disclosure, the high pressure system 20 can include at least one fluid inlet 24 providing a pathway for fluid from an exterior 26 of the pressure vessel 22 to an interior 28 of the pressure vessel 22. According to one embodiment, the at least one fluid inlet 24 can include an orifice through which fluid can be introduced to form at least one jet.

The high pressure system 20 can further include at least one fluid outlet 30 providing a pathway for fluid from the interior 28 of the pressure vessel 22 to the exterior 26 of the pressure vessel 22. According to one embodiment, the pathway provided by the inlet 24 can be the same as the pathway provided by the outlet 30. According to another embodiment, the pathway provided by the inlet 24 can be the different from the pathway provided by the outlet 30.

Figure 2:
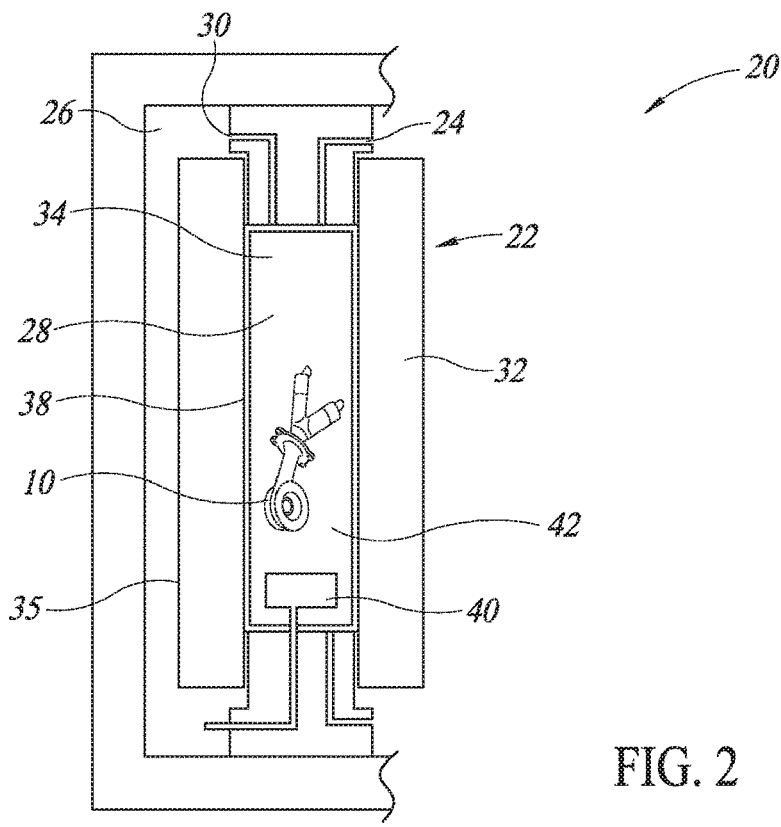
FIG. 2 is a cross-sectional elevation view of an isostatic pressure system according to another embodiment.

As shown in the illustrated embodiment, the pressure vessel 22 can include a vessel body 32 and a vessel chamber 34, the vessel chamber 34 defined by the vessel body 32. According to one aspect of the disclosure at least one of the vessel body 32 and the vessel chamber 34 is cylindrical. As shown in FIG. 1, the high pressure system 20 can include a crucible 36 positioned within the vessel chamber 34. As shown in FIG. 2, the high pressure system 20 can include a coating 38 on an inner surface of the vessel body 32.

Figure 3:
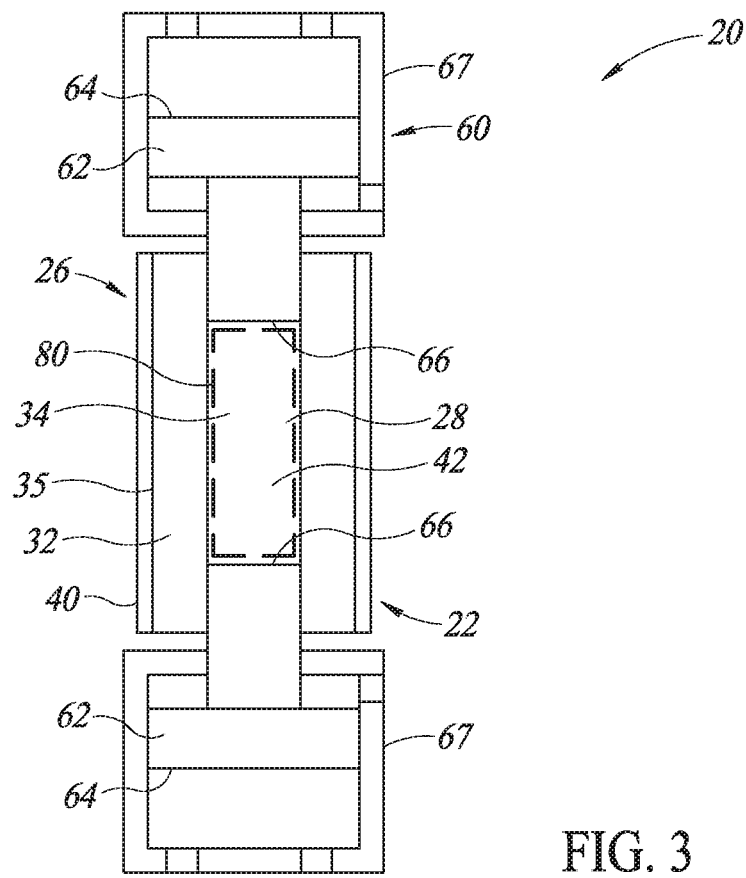
FIG. 3 is a cross-sectional elevation view of an isostatic pressure system according to another embodiment.
Figure 4:
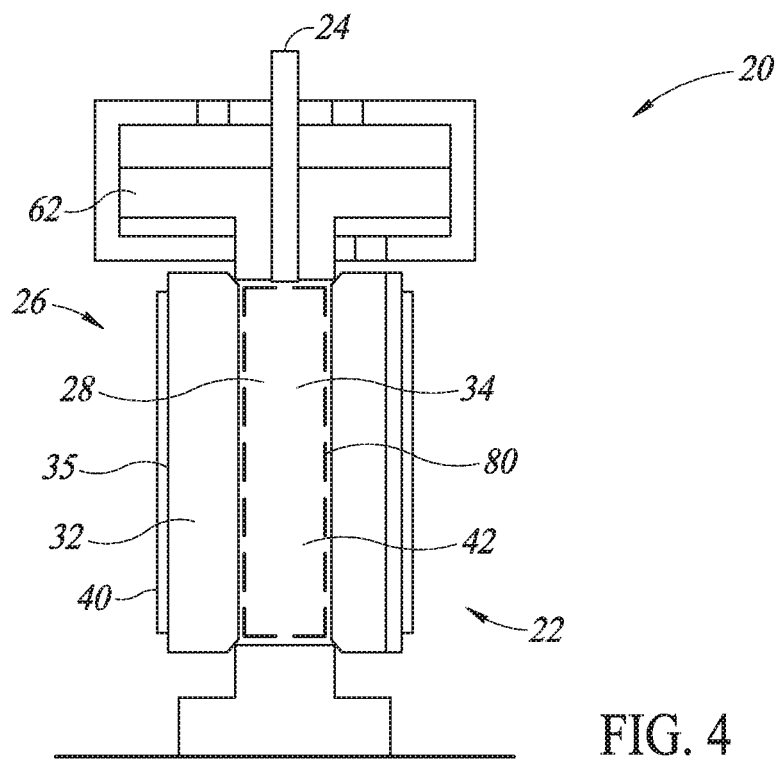
FIG. 4 is a cross-sectional elevation view of an isostatic pressure system according to another embodiment.

The high pressure system 20 can include a heater 40. As shown in FIGS. 1 and 2, the heater 40 can be positioned inside the interior 28 of the pressure vessel 22, for example within the vessel chamber 34. As shown in FIGS. 3 and 4, the heater 40 can be positioned outside the pressure vessel 22, for example wrapped around an outer surface 35 of the vessel body 32. According to one embodiment, the high pressure system 20 can include multiple heaters 40, for example positioned both within the interior 28 and wrapped around the outer surface 35.

Referring to FIG. 1, according to one method of use of the high pressure system 20, the crucible 36 is positioned inside the vessel chamber 34 of the vessel body 32. The crucible 36 is at least partially filled with a first fluid 42 and at least one of the article 10 is submerged within the first fluid 42. According to one embodiment, the first fluid 42 can be a liquid, for example water or oil. The high pressure system 20 can include a separator 44, which transmits pressure from a first portion 46 of the interior 28 of the pressure vessel 22 to a second portion 48 of the interior 28 of the pressure vessel 22. As shown in the illustrated embodiment, the second portion 48 includes the portion of the interior 28 that contains the first fluid 42.

Increased pressure can be applied to the at least one article 10 submerged in the first fluid 42 by pumping a second fluid 50 into the first portion 46 of the interior 28 of the pressure vessel 22. As the second fluid 50 enters the first portion 46, the second fluid 50 contacts and exerts a pressure on one side of the separator 44. The exerted pressure on the separator 44 causes the separator 44 to move toward the second portion 48, thereby compressing the first fluid 42 and increasing pressure within the second portion 48. The second fluid 50 can be pumped into the interior 28 through one of the at least one fluid inlets 24. Overflow of the second fluid 50 can exit the interior 28 through one of the at least one fluid outlets 30.

According to one embodiment, the first fluid 42 and the second fluid 50 can be different fluids. The first fluid 42 may have a higher boiling point than the second fluid 50. For example, the first fluid 42 may include one of oil or water, and the second fluid 50 may include the other of oil or water. According to another embodiment, the first fluid 42 and the second fluid 50 can be the same type of fluid.

Referring to FIG. 2, the pressure system 20 can be devoid of the separator 44. According to one embodiment, a method of use of the pressure system 20 can include submerging the at least one article 10 in a fluid, for example the first fluid 42 and pumping more of the first fluid 50 into the interior 28 of the pressure vessel 22 thereby increasing pressure within the vessel chamber 34 and increasing pressure applied to the at least one article 10. As shown in the illustrated embodiment, the first fluid 42 can be pumped into the interior 28 through one of the at least one fluid inlets 24, and overflow of the first fluid 42 can exit the interior 28 through one of the at least one fluid outlets 30.

Referring to FIG. 3, pressure can be increased within the vessel chamber 34 without the need for pumping fluid into the interior 28 of the pressure vessel 22. As shown in the illustrated embodiment, the high pressure system 20 can include an intensifier assembly 60. According to one embodiment, the intensifier assembly 60 can include a plunger 62 with a first working surface 64 and a second working surface 66.

According to one method of use of the high pressure system 20, a pressure can be supplied to the first working surface 64, which is positioned outside the interior 28 of the pressure vessel 22. According to one embodiment, a fluid can be pumped into an enclosure 67 which houses a portion of the plunger 62 that includes the first working surface 64. The second working surface 66 is positioned within the interior 28 of the pressure vessel 22. The second working surface 66 has a smaller area than the first working surface 64, and thus pressure applied to the interior 28 by the second working surface 66 is greater than the pressure applied to the first working surface 64.

As shown in the illustrated embodiment, the intensifier assembly 60 can include multiple, for example two, of the plungers 62. According to another embodiment, the intensifier assembly 60 can include only one of the plunger 62.

Referring to FIG. 4, the high pressure system 20 can include one or more of the plungers 62, which forms a metal to metal seal with the vessel body 32 while a pressure medium, for example a gas or a fluid, such as the first fluid 42 fills the interior 28 of the pressure vessel 22 thereby increasing pressure within the interior 28.

Figure 5:
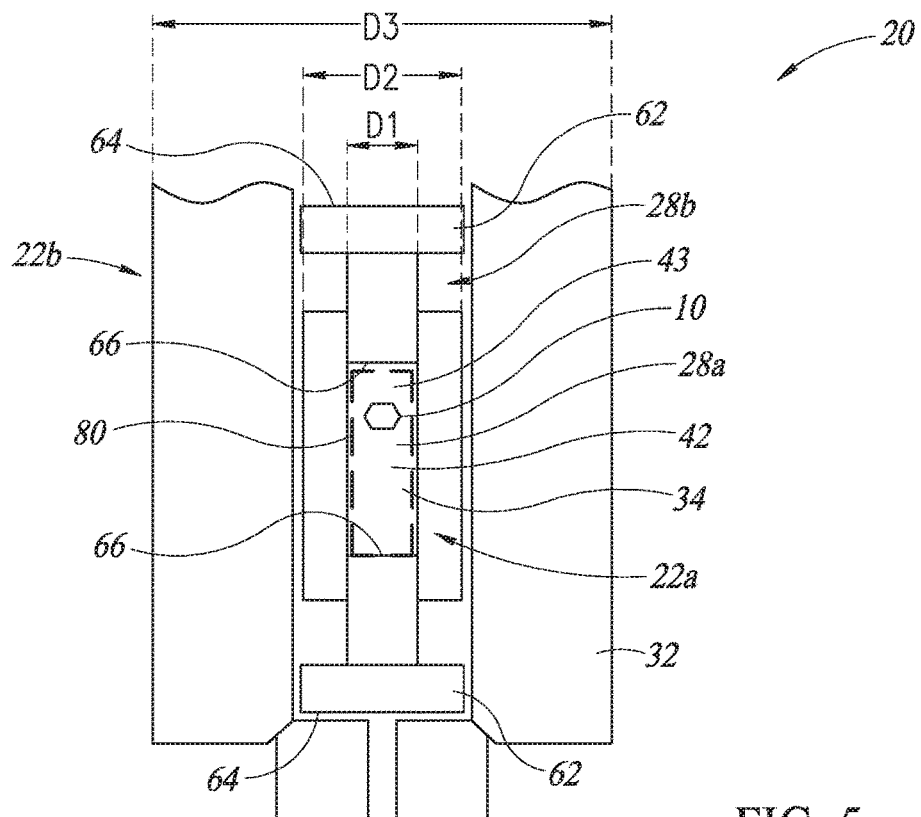
FIG. 5 is a cross-sectional elevation view of an isostatic pressure system according to another embodiment.

Referring to FIG. 5, the high pressure system 20 may include a plurality of pressure vessels to incorporate multi-stage sealing. According to one embodiment, the high pressure system 20 can include a first pressure vessel 22a and a second pressure vessel 22b. As shown in the illustrated embodiment, the first pressure vessel 22a can be positioned at least partially within the interior 28b of the second pressure vessel 22b.

In use, according to one embodiment, the at least one article 10 can be positioned within the interior 28a of the first pressure vessel 22a. The first pressure vessel 22a is positioned within the interior 28b of the second pressure vessel 22b. As pressure is applied, for example to the first working surface 64 of the plunger 62, to the interior 28b of the second pressure vessel 22b, a greater pressure is applied, for example to the second working surface 66 of the plunger 62, to the interior 28a of the first pressure vessel 22a.

The first pressure vessel 22a and the second pressure vessel 22b can be configured and arranged such that the ultimate pressure difference of the high pressure system 20, between the interior 28a of the first pressure vessel 22a and an ambient pressure in an environment surrounding the high pressure system 20 is shared among the seals between the first pressure vessel 22a and the second pressure vessel 22b. According to an aspect of the disclosure, the interior 28a of the first pressure vessel 22a can define a first cross-sectional dimension D1, an outer surface 35a of the first pressure vessel 22a can define a second cross-sectional dimension D2 between about 2 to 3 times the first cross-sectional dimension, and an outer surface 35b of the second pressure vessel 22b can define a third cross-sectional dimension D3 between about 6 to 9 times the first cross-sectional dimension.

According to one embodiment, the high pressure system 20 can be configured such that a first pressure differential measured between the interior 28a of the first pressure vessel 22a and the interior 28b of the second pressure vessel 22b is similar to, for example equal to, a second pressure differential measured between the interior 28b of the second pressure vessel 22b and the ambient pressure. According to another embodiment, the high pressure system 20 can be configured such that the first pressure differential is between about 4 times to about 9 times the second pressure differential. For example, pressure in the interior 28a can be increased to about 200,000 psi, while pressure in the interior 28b is increased to about 50,000 psi.

Figure 6:
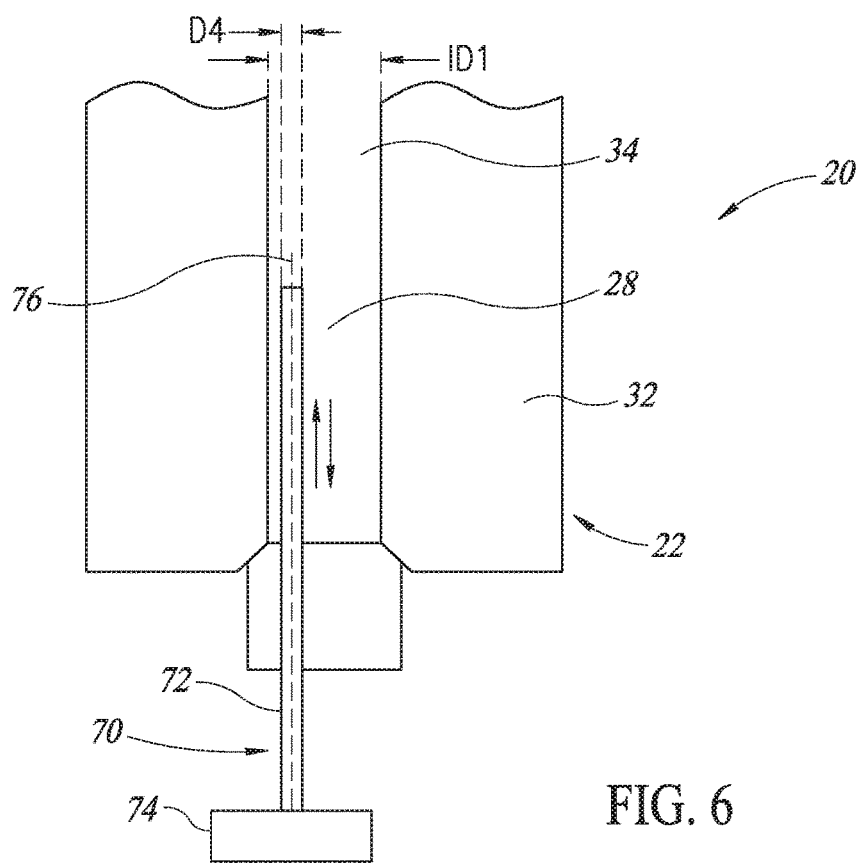
FIG. 6 is a cross-sectional elevation view of an oscillation assembly of an isostatic pressure system according to one embodiment.

Referring to FIG. 6, the high pressure system 20 can include an oscillation assembly 70 that is operably coupled to the interior 28 of the pressure vessel 22 so as to oscillate pressure within the interior 28. According to one embodiment, the oscillation assembly 70 varies the pressure within the interior 28 by about 10 percent of the mean pressure within the interior 28. As shown in the illustrated embodiment, the oscillation assembly 70 can include a member 72 that is movable within the interior 28 of the pressure vessel 22. The member 72 can be elongate along an axis 76, for example a central axis, and movable along a direction parallel to the axis. The oscillation assembly 70 can further include a driver 74 that moves the member 72 with respect to the pressure vessel 22. According to one embodiment, the driver 74 oscillates the member 72 at a rate of about 100 hertz.

The member 72 can define a cross-sectional dimension D4 that is measured in a direction perpendicular to the axis 76. According to one embodiment, the cross-sectional dimension of the member 72 is smaller than the inner cross-sectional dimension ID1 of the interior 28 of the pressure vessel 22. According to one embodiment, the cross-sectional dimension D4 of the member 72 is less than 50 percent of the inner cross-sectional dimension ID1 of the interior 28 of the pressure vessel 22. According to one embodiment, the cross-sectional dimension D4 of the member 72 is less than 25 percent of the inner cross-sectional dimension ID1 of the interior 28 of the pressure vessel 22. According to one embodiment, the cross-sectional dimension D4 of the member 72 is less than 10 percent of the inner cross-sectional dimension ID1 of the interior 28 of the pressure vessel 22.

Referring to FIGS. 1 to 6, the high pressure system 20 can include a container 80. According to one embodiment, a plurality of the article 10 fit within the container 80, and the container 80 fits within the interior 28 of the pressure vessel 22. Use of the container 80 can facilitate rapid loading and unloading of a plurality of the article 10 to/from the pressure vessel 22. According to one embodiment, the container 80 is flexible. According to one embodiment, the container 80 includes a mesh-like structure such that when the container 80 is submerged in the first fluid 42, the first fluid 42 is in direct contact with the plurality of articles 10 within the container 80.

According to another embodiment, the container 80 is sealable such that the plurality of articles 10 inside the container 80 are isolated from the first fluid 42 when the container 80 is submerged in the first fluid 42. The container 80 can be filled with a second fluid 43. The second fluid 43 can be the same type of fluid as the first fluid 42. According to one embodiment, the second fluid 43 can be a different type of fluid than the first fluid 42. For example, the second fluid 43 can be more sensitive to pressure changes than the first fluid 42, such that the first fluid 42 responds to an increase in pressure by a specific amount with a temperature increase of a first amount, the second fluid 43 responds to an increase in pressure by the specific amount with a temperature increase of a second amount, and the second amount is greater than the first amount.

Figure 7:
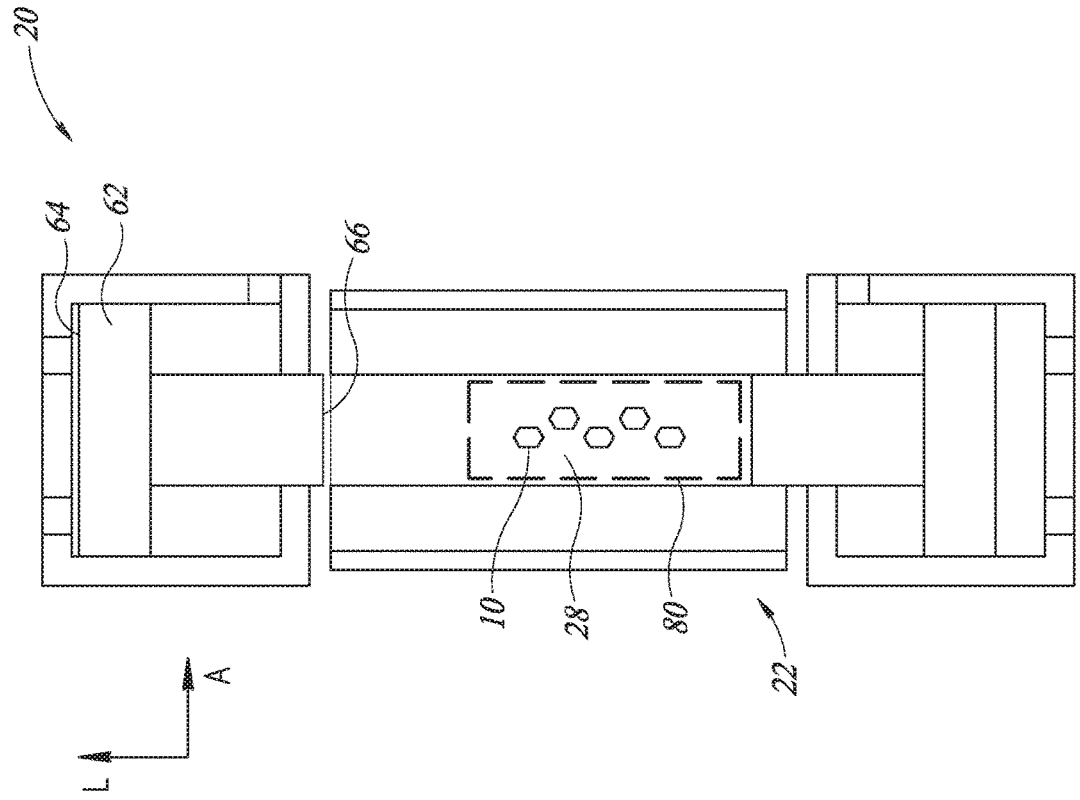
FIG. 7 is a cross-sectional elevation view of the isostatic pressure system illustrated in FIG. 3, the isostatic pressure system in a first configuration.
Figure 8:
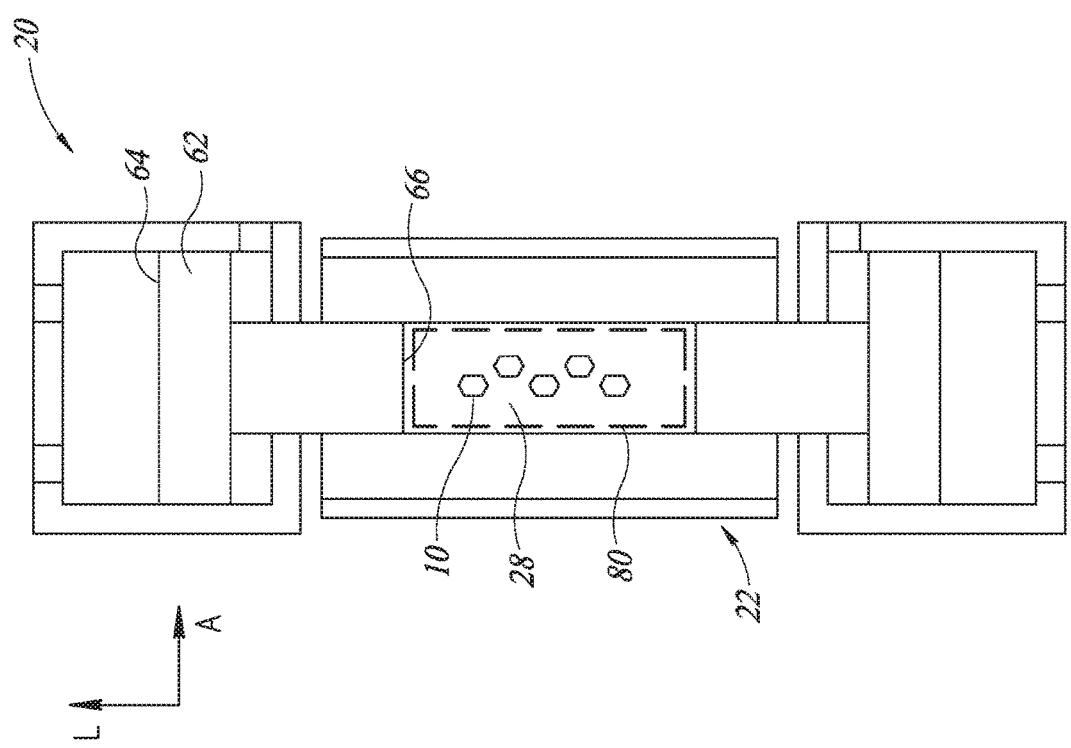
FIG. 8 is a cross-sectional elevation view of the isostatic pressure system illustrated in FIG. 7, the isostatic pressure system in a second configuration.
Figure 9:
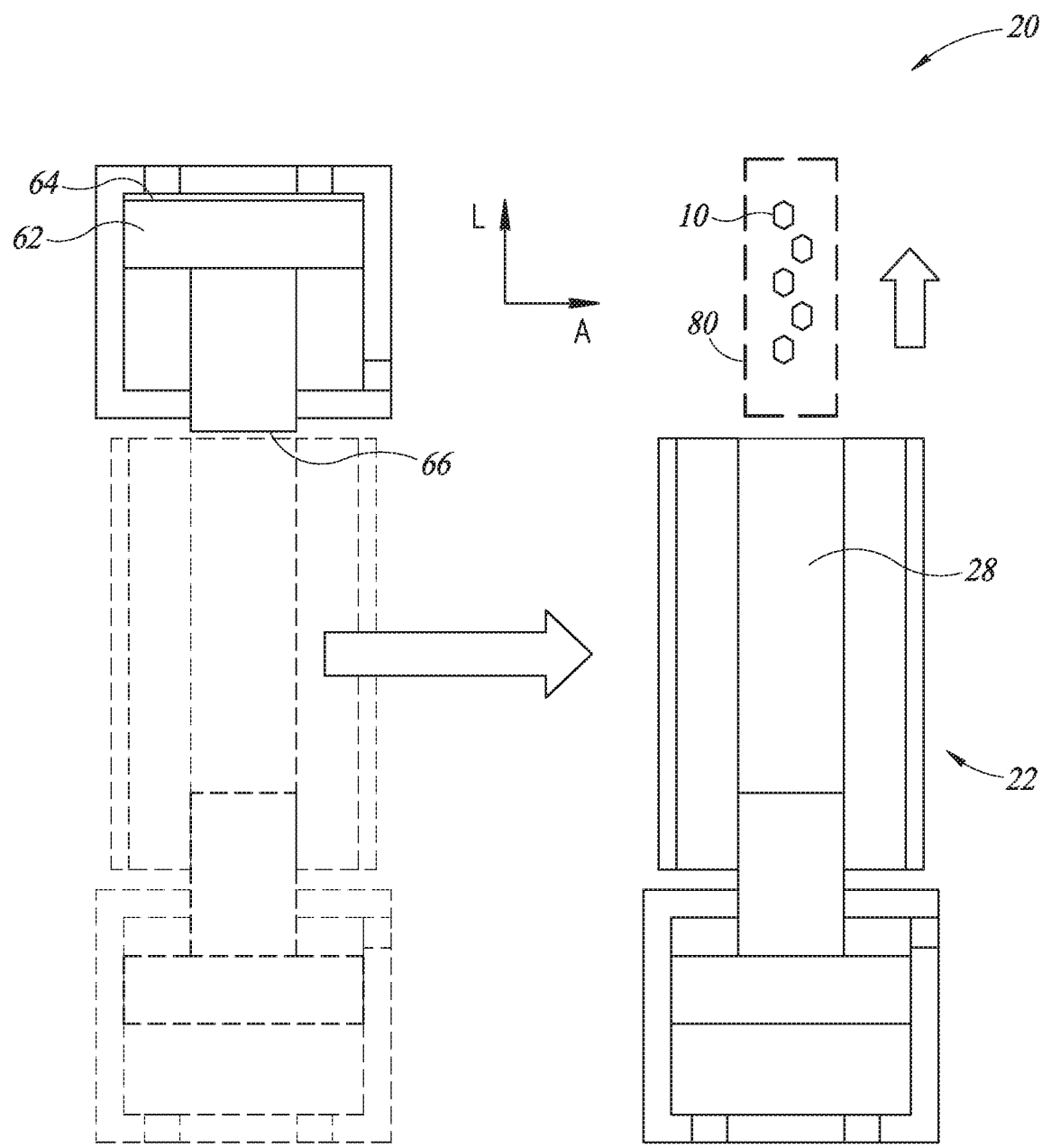
FIG. 9 is a cross-sectional elevation view of the isostatic pressure system illustrated in FIG. 7, the isostatic pressure system in a third configuration.
Figure 10:
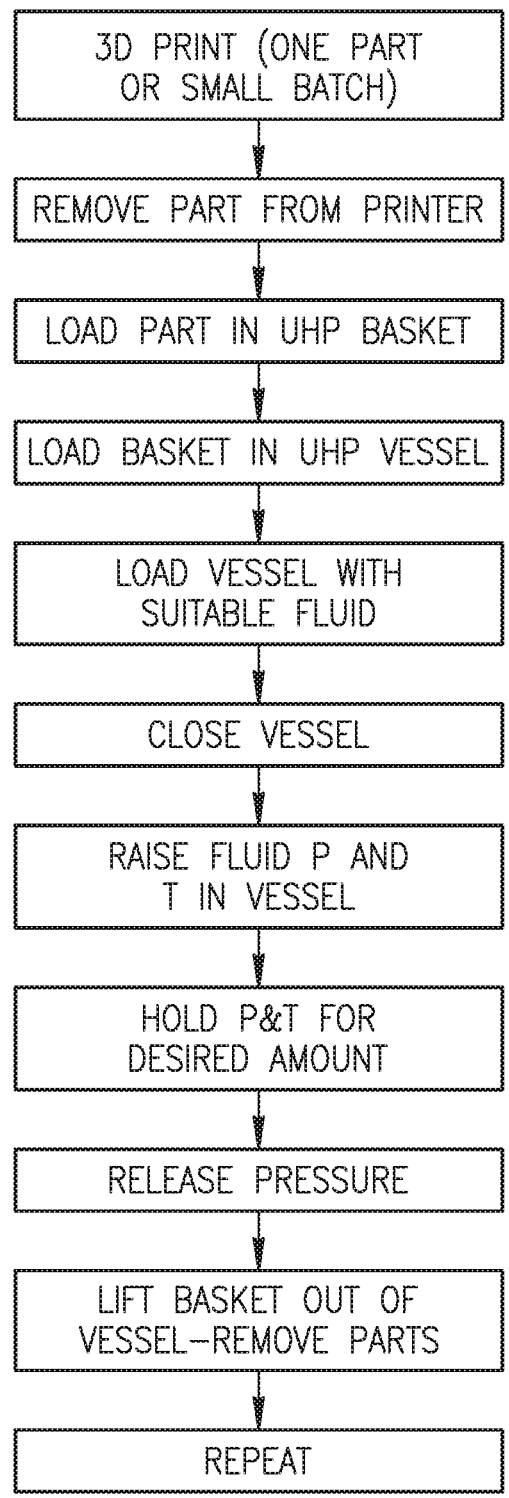
FIG. 10 is a flow chart for a method of manufacturing an article according to one embodiment.

Referring to FIGS. 7 to 9, a method of use of the high pressure system 20 can include retracting the second working surface 66 of at least one of the plungers 62 from the interior 28 of the pressure vessel 22 (as shown in FIG. 8). According to one embodiment, retracting the second working surface 66 from the interior 28 includes moving the plunger 62 in a first direction L. The method can further include moving at least one of the plunger 62 and the pressure vessel 22 with respect to the other of the plunger 62 and the pressure vessel 22 until the interior 28 of the pressure vessel 22 is accessible (as shown in FIG. 9). According to one embodiment, moving at least one of the plunger 62 and the pressure vessel 22 with respect to the other of the plunger 62 and the pressure vessel 22 includes moving at least one of the plunger 62 and the pressure vessel 22 along a second direction A that is perpendicular to the first direction L.

The method can further include, after the interior 28 of the pressure vessel 22 is accessible, removing the container 80 from the interior 28, thereby removing a first plurality of the articles 10 within the container 80 from the interior 28 simultaneously. The method can further include removing the first plurality of the articles 10 from the container 80. A second plurality of the articles 10 can be placed within the container 80 (or a second one of the containers 80), which can then be placed back within the interior 28 of the pressure vessel 22. The method can further include insertion of the second working surface 66 within the interior 28, and subsequently applying pressure to the interior 28 of the pressure vessel 22 (as shown in FIG. 7).

Referring to FIGS. 1 to 10, a method of manufacturing an article 10 using the high pressure system 20 includes inserting at least one of the article 10 into the interior 28 of the pressure vessel 22. Inserting the at least one article 10 into the interior 28 of the pressure vessel 22 can include inserting the at least one article 10 into the container 80.

According to one embodiment, the article 10 can be a component that is produced through additive manufacturing. The article 10 may be a "finished" component, such that no further additive manufacturing of the article 10 is needed, or the article may be an "unfinished" component, such that further additive manufacturing of the article 10 is needed.

According to one embodiment, inserting the at least one article 10 into the container 80 can include submerging the at least one article 10 in a liquid. The method can further include closing the container 80 such that an interior of the container 80 is devoid of any gaseous substances. The container 80 with the at least one article 10 inside can be placed within the interior 28 of the pressure vessel 22, for example such that the container 80 is submerged in the first fluid 42.

The method of manufacturing can include reducing an amount of unoccupied space inside the pressure vessel 22. Reducing the amount of unoccupied space inside the pressure vessel 22 can be performed prior to increasing pressure inside the pressure vessel 22, According to one embodiment, reducing the amount of unoccupied space inside the pressure vessel 22 can be performed either prior to, subsequent to, or contemporaneously with placing the article 10 into the pressure vessel 22. For example, the amount of unoccupied space inside the pressure vessel can be reduced, then the article 10 can be inserted or placed inside the pressure vessel 22, and then the amount of unoccupied space inside the pressure vessel 22 can be further reduced.

As shown in FIG. 1, reducing the amount of unoccupied space inside the pressure vessel 22 can include positioning one or more solid objects 17 within the pressure vessel. The one or more solid objects 17 can be made of a material with a high thermal conductivity. The reduction of the amount of unoccupied space inside the pressure vessel 22, for example by addition of the one or more solid objects 17, can reduce the amount of space that needs to be filled by, for example, the first fluid 42. Reduction of the amount of first fluid 42 used to fill the inside of the pressure vessel 22 can increase efficiency of the high pressure system 20 by reducing heating and/or pressurization times, and reducing the amount of fluid used and waste generated during operation of the system 20.

A total amount of unoccupied space inside the pressure vessel 22 can be defined as the total volume inside the pressure vessel 22 minus the total volume of the one or more articles 10 positioned inside the pressure vessel 22. According to one embodiment, the total amount of unoccupied space can be reduced by up to 25% by positioning the one or more solid objects 17 inside the pressure vessel 22, along with the one or more articles 10, prior to pressurization of the inside of the pressure vessel 22. According to one embodiment, the total amount of unoccupied space can be reduced by up to 50% by positioning the one or more solid objects 17 inside the pressure vessel 22, along with the one or more articles 10, prior to pressurization of the inside of the pressure vessel 22. According to one embodiment, the total amount of unoccupied space can be reduced by up to 75% by positioning the one or more solid objects 17 inside the pressure vessel 22, along with the one or more articles 10, prior to pressurization of the inside of the pressure vessel 22. According to one embodiment, the total amount of unoccupied space can be reduced by up to 90% by positioning the one or more solid objects 17 inside the pressure vessel 22, along with the one or more articles 10, prior to pressurization of the inside of the pressure vessel 22.

The pressure vessel 22 can be closed such that the interior 28 is isolated from the ambient pressure of the surrounding environment. After the pressure vessel is closed, at least one of pressure and temperature can be raised within the interior 28 of the pressure vessel 22.

According to one embodiment, the method includes increasing the pressure inside the interior 28 of the pressure vessel 22 to greater than 30,000 psi. According to one embodiment, the method includes increasing the pressure inside the interior 28 of the pressure vessel 22 to greater than 100,000 psi. The method can include maintaining a temperature inside the interior 28 of the pressure vessel 22 below 1,000 degrees Celsius (C) while increasing the pressure inside the interior 28 of the pressure vessel 22. According to one embodiment, the method includes increasing the temperature inside the interior 28 of the pressure vessel 22 to between about 150 degrees C. and about 1,000 degrees C. The method can include preventing the temperature inside the interior 28 of the pressure vessel 22 from ever increasing above 1,000 degrees C., for example while the article 10 is inside the interior 28 of the pressure vessel 22. According to one embodiment, the method includes both increasing the pressure inside the interior 28 of the pressure vessel 22 to greater than 30,000 psi, and increasing the temperature inside the interior 28 of the pressure vessel 22 to between about 150 degrees C. and about 1,000 degrees C. while the pressure is greater than 30,000 psi. According to one embodiment, increasing the pressure inside the interior 28 subjects the at least one article 10 to isostatic pressure.

The method can include reducing at least one of the pressure and the temperature inside the interior 28 of the pressure vessel 22. The method can include removing the at least one article 10 from the interior 28 of the pressure vessel 22. According to one embodiment, removing the at least one article 10 from the interior 28 of the pressure vessel 22 includes removing the container 80 from the interior 28 of the pressure vessel 22, thereby removing all of the at least one article 10 from the interior 28 of the pressure vessel 22 simultaneously.

According to one embodiment, the method includes maintaining the temperature within the interior 28 between about 400 degrees C. and about 600 degrees C. for at least a portion of the time during which the pressure within the interior 28 is above 30,000 psi. According to one embodiment, the method includes maintaining the temperature within the interior 28 at about 400 degrees C. for at least a portion of the time during which the pressure within the interior 28 is above 30,000 psi.

According to one embodiment, increasing temperature inside the interior 28 of the pressure vessel 22 includes introducing fluid into the pressure vessel 22 through at least one orifice to form at least one jet. According to one embodiment, the method includes purging gas from inside the interior 28 of the pressure vessel 22 while introducing fluid into the pressure vessel 22 through the at least one orifice.

The method can include manufacturing a first portion of the article 10, removing the first portion of the article 10 from the pressure vessel 22 after increasing the pressure within the interior 28 of the pressure vessel 22 with the first portion of the article 10 in the interior 28, and manufacturing a second portion article 10. According to one embodiment, at least one of manufacturing the first portion and manufacturing the second portion includes an additive manufacturing process. According to one embodiment, the first portion and the second portion are manufactured such that the resulting article 10 is monolithic. The method can further include inserting both the first portion and the second portion of the article 10 within the interior 28 of the pressure vessel 22, and subsequently increasing pressure within the interior 28 of the pressure vessel to greater than 30,000 psi.

The method can include, after removing the article 10 from the pressure vessel 22, and before placing both the first portion and the second portion into the pressure vessel 22, performing a surface treatment on a surface of the first portion. According to one embodiment, the surface treatment includes one or more of: peening, texturing, finishing, and cleaning. According to one embodiment, the surface treatment is performed with a waterjet. The method can include shuttling the article 10 from an additive manufacturing machine, for example a 3D printer, to a waterjet, performing the surface treatment on the article 10, and then shuttling the article 10 back to the additive manufacturing machine for further additive manufacturing, for example directly on a surface of the article 10 that was just treated with the surface treatment.

The method can include applying a high pressure jet to the article 10 while the article 10 is under isostatic pressure. This may affect cavitation peening to the article 10. According to one embodiment, the amount of isostatic pressure is selected for optimal cavitation peening, and then the isostatic pressure is raised to reduce porosity in the article 10. For example, the article 10 may be subjected to 10,000 psi of isostatic pressure and subjected to cavitation peening sing 90,000 psi pressure jets, and then after completion of the cavitation peening, the isostatic pressure can be raised to 90,000 psi.

The surface treatment can be performed with a pure round waterjet, a pure round fluid jet, a water (or other liquid) fan jet, a water/air jet (air mixed with a waterjet), a water/water jet (water mixed with a waterjet), a liquid/water jet (liquid other than water mixed with a waterjet), a pulsed fluid jet (round or fan shaped), a particle/waterjet (solid particles mixed with waterjet), cavitation (caused by high velocity jets), or any combination thereof.

The surface treatment can be applied to the article 10 using stationary jets and the article 10 manipulated with a robotic arm, a stationary, rotatory, or oscillating jet(s), and a manipulated jet(s) supported by a robotic arm.

The method can include oscillating pressure inside the pressure vessel 22 after placing the article 10 into the pressure vessel 22 and before removing the article 10 from the pressure vessel 22.

The method can further include sealing the article 10 within the first pressure vessel 22a, sealing the first pressure vessel 22a within the second pressure vessel 22b, and increasing the pressure within both the interior 28a of the first pressure vessel 22a and the interior 28b of the second pressure vessel 22b.

According to one embodiment, the method can include opening the pressure vessel 22 thereby providing access to the article 10 inside the pressure vessel 22 after reducing the pressure inside the pressure vessel 22 and before removing the article 10 from the pressure vessel 22. The method can further include after removing the article 10 from the pressure vessel 22, closing the pressure vessel 22 within a set amount of time of opening the pressure vessel 22, for example between one minute and five minutes. According to one embodiment, the pressure vessel 22 defines an outer diameter of less than ten inches.

The method can include one or more of: inserting a material into a void defined by the article 10 before placing the article 10 into the pressure vessel 22; enclosing the article 10 and the inserted material in an enclosure; removing the article 10 and the inserted material from the enclosure after removing the article 10 from the pressure vessel 22; and removing the inserted material from the void after removing the article 10 and the inserted material from the enclosure.

According to one embodiment, inserting the material into the void includes immersing the article 10 in a wax-like material. According to one embodiment, enclosing the article 10 and the inserted material in an enclosure includes vacuum bagging the article 10 and the inserted material. The method can include lowering the temperature of the article 10 prior to placing the article 10 into the pressure vessel 22. Lowering the temperature of the article 10 can include exposing the article 10 to a refrigerant for an amount of time, for example between one minute and ten minutes.

Referring still to FIGS. 1 to 10, a second method of manufacturing the article 10 includes producing a first portion of the article 10, applying pressure to the first portion, removing the pressure from the first portion, producing a second portion of the article 10, after removing the pressure from the first portion, applying pressure to both the first portion and the second portion, and removing the pressure from both the first portion and the second portion. According to one embodiment, producing at least one of the first portion of the article 10 and the second portion of the article 10 includes an additive manufacturing process.

Producing the second portion of the article 10 can include performing the additive manufacturing process directly on the first portion of the article 10. Applying pressure to the first portion of the article 10 can include applying pressure to the first portion greater than 30,000 psi. Applying pressure to the first portion of the article 10 can include applying pressure to the first portion greater than 100,000 psi.

Applying pressure to the first portion can include submerging the first portion in a fluid, for example the first fluid 42. The second method can include preventing the temperature of the fluid from exceeding 1000 degrees C. at any time while the first portion is submerged in the fluid. The second method can include at least one of: while applying pressure to the first portion, increasing temperature of the fluid to between about 150 degrees C. and about 1000 degrees C.; and preventing the temperature of the fluid from exceeding 1000 degrees C. at any time before removing the pressure from the first portion. The second method can include increasing temperature of the fluid to between about to between about 400 degrees C. and about 600 degrees C.

The second method can include submerging both the first portion and the second portion in the fluid to apply pressure to both the first portion and the second portion. The second method can further include at least one of: increasing temperature of the fluid to between about 150 degrees C. and about 1000 degrees C. while submerging both the first portion and the second portion; and preventing the temperature of the fluid from exceeding 1000 degrees C. at any time before removing the pressure from both the first portion and the second portion. According to one embodiment, the second method can include increasing the temperature of the fluid in which both the first portion and the second portion are submerged to between about 400 degrees C. and about 600 degrees C.

The second method can include oscillating the pressure applied to the first portion after applying pressure to the first portion and before removing the pressure from the first portion. The second method can include oscillating the pressure applied to both the first portion and the second portion after applying pressure to both the first portion and the second portion and before removing the pressure from both the first portion and the second portion.

The second method can include performing a surface treatment on a surface of the first portion after removing the pressure from the first portion and applying pressure to both the first portion and the second portion. According to one embodiment, the surface treatment includes one or more of: peening, texturing, finishing, and cleaning. According to one embodiment, the surface treatment is performed with a water jet.

According to one embodiment, the high pressure system 20 includes an isostatic pressure system including an ultra-high pressure vessel, for example the pressure vessel 22, defining the interior 28, which receives a fluid, for example the first fluid 42. The high pressure system 20 can further include a pressure intensifier, for example the intensifier assembly 60, coupled to the ultra-high pressure vessel such that actuation of the pressure intensifier increases the pressure within the interior 28 to at least 30,000 psi. The high pressure system 20 can further include a heating element, for example the heater 40, coupled to the ultra-high pressure vessel such that activation of the heating element increases the temperature within the interior 28 to between about 150 degrees C. and about 1000 degrees C.

According to one embodiment, the heating element is positioned within interior 28. The pressure intensifier can include a plunger, such as the plunger 62 coupled to the ultra-high pressure vessel such that the plunger 62 is movable in a direction to increase the pressure within the interior 28. The plunger 62 can define a first portion, for example the first working surface 64, and a second portion, for example the second working surface 66. According to one embodiment, that the first portion defines a cross-sectional dimension measured in a direction that is perpendicular to the direction of movement of the plunger 62, the second portion defines a second cross-sectional dimension measured in the direction perpendicular to the direction of movement of the plunger 62, and the first cross-sectional dimension is greater than the second cross-sectional dimension.

The high pressure system 20 can include a pressure chamber enclosing the first portion of the plunger 62 such that the first portion of the plunger 62 is movable within the pressure chamber. The pressure chamber can include an inlet for a pressure medium to drive the plunger 62.

The high pressure system 20 defines a first configuration in which an entirety of the plunger 62 is removed from the interior 28. According to one embodiment, when the high pressure system in in the plunger 62 is in the first configuration at least one of the pressure chamber and the ultra-high pressure vessel is movable relative to the other of the pressure chamber and the ultra-high pressure vessel.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of manufacturing an article, the method comprising:
    placing the article within a flexible container and then closing the flexible container such that an interior of the flexible container is devoid of gas;
    after placing the article within the flexible container, placing the flexible container with the article inside into a pressure vessel and submerging the article and flexible container in a first liquid;
    reducing an amount of unoccupied space inside the pressure vessel by moving a second liquid into a space defined between the pressure vessel and the flexible container, wherein the second liquid is a different liquid than the first liquid;
    after placing the flexible container with the article inside into the pressure vessel, increasing pressure inside the pressure vessel to greater than 30,000 psi;
    after increasing pressure inside the pressure vessel, subjecting the article to hydrostatic pressure while preventing temperature inside the pressure vessel from exceeding 1000 degrees C.;
    reducing pressure inside the pressure vessel;
    removing the article from the pressure vessel;
    removing the flexible container with the article inside from the pressure vessel; and
    after removing the flexible container with the article inside from the pressure vessel, removing the article from inside the flexible container,
    wherein the first liquid responds to an increase in pressure by a specific amount by increasing temperature a first amount, the second liquid responds to an increase in pressure by the specific amount by increasing temperature a second amount, and the first amount is greater than the second amount.

2. A method of manufacturing an article, the method comprising:
    producing a first portion of the article;
    placing the first portion of the article into a pressure vessel;
    after placing the article into the pressure vessel, increasing pressure inside the pressure vessel to greater than 30,000 psi;
    after increasing pressure inside the pressure vessel, subjecting the article to hydrostatic pressure while preventing temperature inside the pressure vessel from exceeding 1000 degrees C.;

reducing pressure inside the pressure vessel;

removing the article from the pressure vessel;

after removing the article from the pressure vessel, producing a second portion of the article; and placing both the first portion and the second portion into the pressure vessel.

3. The method of claim 2, further comprising:

after removing the article from the pressure vessel and before placing both the first portion and the second portion into the pressure vessel, performing a surface treatment on a surface of the first portion.

4. The method of claim 3 wherein the surface treatment includes one or more of: peening, texturing, finishing, and cleaning.

5. The method of claim 4 wherein the surface treatment is performed with a water jet.

6. The method of claim 2 wherein:

producing the first portion of the article involves an additive manufacturing process; and producing the second portion of the article involves an additive manufacturing process performed on the first portion, such that the first portion and the second portion are formed monolithically.

7. A method of manufacturing an article, the method comprising:

inserting a material into a void defined by the article;

enclosing the article and the inserted material in an enclosure;

placing the enclosure with the article and the inserted material enclosed therein into a pressure vessel;

after placing the article into the pressure vessel, increasing pressure inside the pressure vessel to greater than 30,000 psi;

after increasing pressure inside the pressure vessel, subjecting the article to hydrostatic pressure while preventing temperature inside the pressure vessel from exceeding 1000 degrees C.;

reducing pressure inside the pressure vessel;

removing the enclosure with the article and the inserted material enclosed therein from the pressure vessel;

after removing the enclosure with the article and the inserted material enclosed therein from the pressure vessel, removing the article and the inserted material from the enclosure; and after removing the article and the inserted material from the enclosure, removing the inserted material from the void.

8. The method of claim 7 wherein inserting the material into the void includes immersing the article in a wax-like material.

9. The method of claim 7 wherein enclosing the article and the inserted material in an enclosure includes vacuum bagging the article and the inserted material.

* * * * *